(12) United States Patent
Sato et al.

(10) Patent No.: US 8,033,570 B2
(45) Date of Patent: Oct. 11, 2011

(54) SIDE AIRBAG APPARATUS

(75) Inventors: Yuji Sato, Aichi-ken (JP); Koji Shibayama, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/801,731

(22) Filed: Jun. 23, 2010

(65) Prior Publication Data
US 2011/0012330 A1    Jan. 20, 2011

(30) Foreign Application Priority Data
Jul. 14, 2009  (JP) .................................. 2009-165756

(51) Int. Cl.
*B60R 21/16* (2006.01)
(52) U.S. Cl. .................................................. 280/730.2
(58) Field of Classification Search ................ 280/730.2
See application file for complete search history.

(56) References Cited

U.S. PATENT DOCUMENTS

| | | | | |
|---|---|---|---|---|
| 5,324,072 A * | 6/1994 | Olson et al. | ................ | 280/730.2 |
| 5,333,899 A * | 8/1994 | Witte | ................ | 280/730.2 |
| 5,647,609 A * | 7/1997 | Spencer et al. | ................ | 280/730.2 |
| 5,806,881 A * | 9/1998 | Richter et al. | ................ | 280/730.2 |
| 6,478,329 B1 * | 11/2002 | Yokoyama | ................ | 280/729 |
| 7,819,419 B2 * | 10/2010 | Hayashi et al. | ................ | 280/730.1 |
| 7,828,322 B2 * | 11/2010 | Breuninger et al. | ................ | 280/730.2 |
| 7,871,104 B2 * | 1/2011 | Hayashi | ................ | 280/730.2 |
| 2008/0079248 A1 * | 4/2008 | Hayashi | ................ | 280/730.2 |
| 2008/0231026 A1 * | 9/2008 | Naito et al. | ................ | 280/730.2 |
| 2009/0206585 A1 * | 8/2009 | Honda | ................ | 280/730.2 |
| 2010/0276915 A1 * | 11/2010 | Breuninger et al. | ................ | 280/729 |

FOREIGN PATENT DOCUMENTS

JP      2003-261000 A      9/2003

* cited by examiner

*Primary Examiner* — Faye M. Fleming
(74) *Attorney, Agent, or Firm* — Posz Law Group, PLC (57) ABSTRACT

An airbag 40 is partitioned into a shoulder protecting portion 57 and a lower region protecting portion 56 by a partition portion 45. The shoulder protecting portion 57 is inflated in a space that is beside the shoulder PS of an occupant P and beside and in the vicinity of the top 16 of a door trim 14, thereby protecting the shoulder PS. The lower region protecting portion 56 is inflated below the shoulder protecting portion 57, thereby protecting a part below the shoulder PS of the occupant P. The shoulder protecting portion 57 has a support portion 66 and a shoulder receiving portion 67. When the inflated shoulder protecting portion 57 falls outward of the vehicle while pivoting on the partition portion 45, the support portion 66 contacts a part that is inward of and below the top 16, thereby supporting the shoulder protecting portion 57. When the shoulder protecting portion 57 is supported by the door trim 14 at the support portion 66, at least a part of the shoulder receiving portion 67 is located above the top 16 and contacts the shoulder PS of the occupant P at a position inward of an end 45A of the partition portion 45 on the vehicle outer side. In this manner, the shoulder receiving portion 67 receives the shoulder PS.

11 Claims, 8 Drawing Sheets

SIDE AIRBAG APPARATUS

BACKGROUND OF THE INVENTION

The present invention relates to a side airbag apparatus that inflates and deploys an airbag in a space between a side door and an occupant seated in a vehicle seat when an impact is applied from a side of the vehicle due to a side collision, thereby reducing the impact using the airbag to protect at least a shoulder of the occupant.

A side airbag apparatus is effective as means for protecting an occupant seated in a vehicle seat when an impact is applied to the vehicle from a side due to a side collision. Such a side apparatus includes an inflator that discharges inflation gas in response to an impact to inflate and deploy an airbag in a narrow space between an occupant and a side door. One type of such airbag apparatuses includes an airbag with a shoulder protecting portion, which is inflated and deployed beside at least a shoulder of an occupant (for example, refer to Japanese Laid-Open Patent Publication No. 2003-261000).

The airbag of the side airbag apparatus disclosed in the above publication is formed by joining a fabric sheet on a vehicle inner side and a fabric sheet on a vehicle outer side at peripheries. Each fabric sheet has such a size that it can be inflated and deployed beside a region ranging from the shoulder to the lumbar region of an occupant. The fabric portions are joined to each other at a center portion in the vertical direction by a lateral U-shaped inner joint portion. The inner joint portion divides the airbag into a thorax protecting portion, a shoulder protecting portion, and a lumbar region protecting portion. The thorax protecting portion is surrounded by the inner joint portion and is inflated and deployed beside the thorax of the occupant. The shoulder protecting portion is located above the inner joint portion and is inflated and deployed beside the shoulder of the occupant. The lumbar region protecting portion is located below the inner joint portion and is inflated and deployed beside the lumbar region of the occupant. In the apparatus of the above described publication, the inner joint portion is referred to as a seam, the thorax protecting portion is referred to as an intermediate chamber, the shoulder protecting portion is referred to as an upper chamber, and the lumbar region protecting portion is referred to as a lower chamber.

The above described airbag is inflated and deployed such that the upper end of the inner joint portion, that is, the boundary between the shoulder protecting portion and the thorax protecting portion, is located beside and in the vicinity of the top of the door trim of the side door.

When the side door bulges into the passenger compartment due to a side collision, the airbag is pushed in the same direction. At this time, the shoulder protecting portion of the airbag is prevented from moving inward in the passenger compartment by the shoulder of the occupant. Therefore, the shoulder protecting portion falls toward the outside of the vehicle while pivoting on the boundary between the shoulder protecting portion and the thorax protecting portion (the upper end of the inner joint portion). The fallen shoulder protecting portion contacts the top of the door trim and moves toward the vehicle outside while contacting the top. That is, the shoulder protecting portion slides along the door trim. The shoulder protecting portion thus can hardly exercise the function for protecting the shoulder of the occupant from a side collision in a satisfactory manner.

SUMMARY OF THE INVENTION

Accordingly, it is an objective of the present invention to provide a side airbag apparatus that is capable of reliably protecting the shoulder of an occupant from the impact of a side collision even if a shoulder protecting portion falls toward the outside of the vehicle.

To achieve the foregoing objective and in accordance with one aspect of the present invention, a side airbag apparatus including an inflator and an airbag is provided. The inflator generates inflation gas in response to an impact applied to a vehicle from a side. The airbag is inflated in a space between an occupant seated in a vehicle seat and a side door of the vehicle by the inflation gas supplied by the inflator. The airbag includes a shoulder protecting portion and a lower region protecting portion, which are defined by a partition portion. The shoulder protecting portion protects a shoulder of the occupant by being inflated in a space that is beside the shoulder and beside and in the vicinity of a door trim of the side door. The lower region protecting portion protects a part below the shoulder of the occupant by being inflated in a space below the shoulder protecting portion. The shoulder protecting portion includes a support portion and a shoulder receiving portion. When the shoulder protecting portion is inflated and falls outward of the vehicle while pivoting on the partition portion, the support portion contacts part of the shoulder protecting portion that is inward of the top of the door trim in the vehicle widthwise direction and below the top, thereby supporting the shoulder protecting portion. When the shoulder protecting portion is supported to the door trim at the support portion, the shoulder receiving portion is at least partly located above the top of the door trim and contacts the shoulder of the occupant at a position inward of the outer end of the partition portion in the vehicle widthwise direction, thereby receiving the shoulder.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a side airbag apparatus according to one embodiment of the present invention will be described with reference to FIGS. 1 to 10.

In the following, the direction in which a vehicle advances forward is defined as the front (front of the vehicle), and the reverse direction is defined as the rear (rear of the vehicle). In the following description, the vertical direction refers to the up-down direction of the vehicle, and the left-right direction refers to the widthwise direction of the vehicle, that is, the left-right direction when the vehicle is driving forward.

Figure 2:
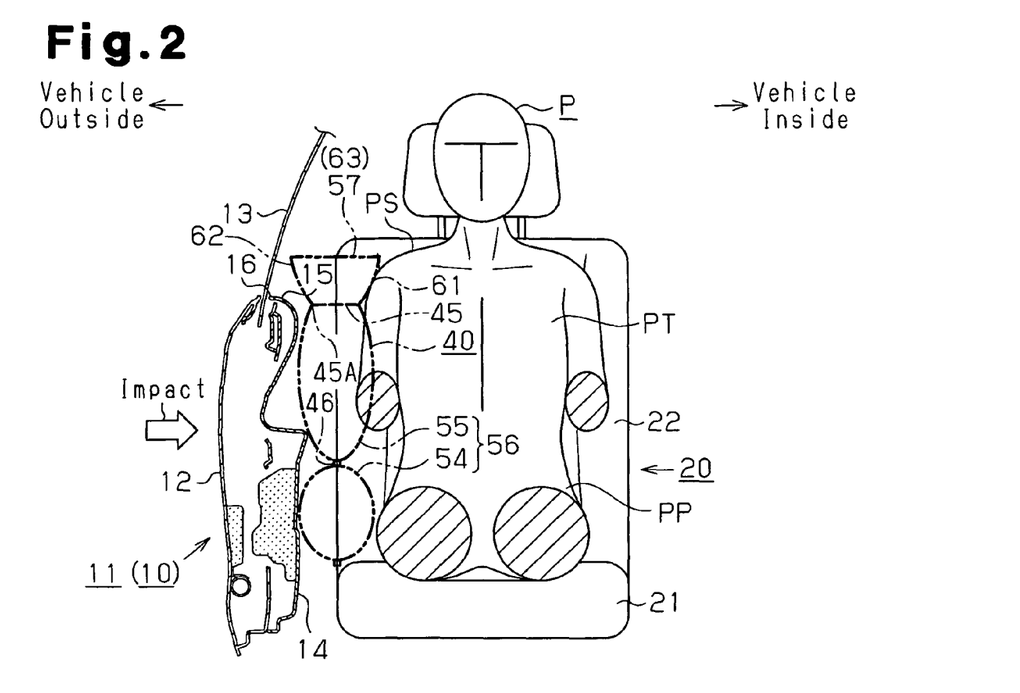
FIG. 2 is a cross-sectional front view showing, together with the occupant and the airbag, the positional relationship between the vehicle seat of FIG. 1 and a side door.
Figure 3:
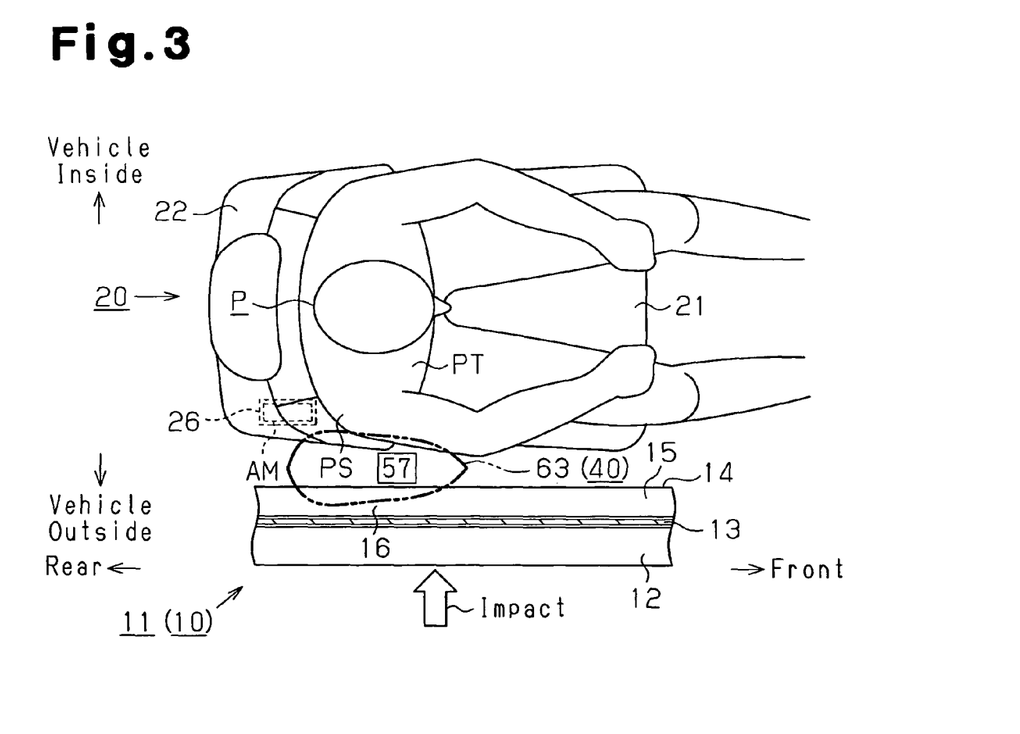
FIG. 3 is a cross-sectional plan view showing the positional relationship between the vehicle seat of FIG. 2 and the side door, together with the occupant and the airbag.

As shown in FIGS. 2 and 3, a part of the side of a vehicle is formed by a side door 11. The side door 11 includes a door main body 12 forming the lower part and a window glass 13 provided in the door main body 12. The window glass 13 is selectively lifted and lowered. A part of the door main body 12 that is on the vehicle inner side of the window glass 13 is a door trim 14 formed of synthetic resin. The door trim 14 has a curved surface 15 at the upper corner facing inside of the passenger compartment. The curved surface 15 bulges into the passenger compartment. The height of the curved surface 15 is highest at the boundary with the window glass 13 and is gradually lowered toward the passenger compartment from the highest part (hereinafter, referred to as a top 16).

A vehicle seat 20 is located in the vicinity of the vehicle inner side of the side door 11 (on the right as viewed in FIG. 2, and on the upper side as viewed in FIG. 3). The vehicle seat 20 includes a seat cushion 21 and a backrest 22. The backrest 22 extends upward from the rear end of the seat cushion 21, and the inclination of the backrest 22 is adjusted by a tilt adjusting mechanism (not shown).

The internal structure of the side portion on the vehicle outer side of the backrest 22 will now be described.

Figure 7:
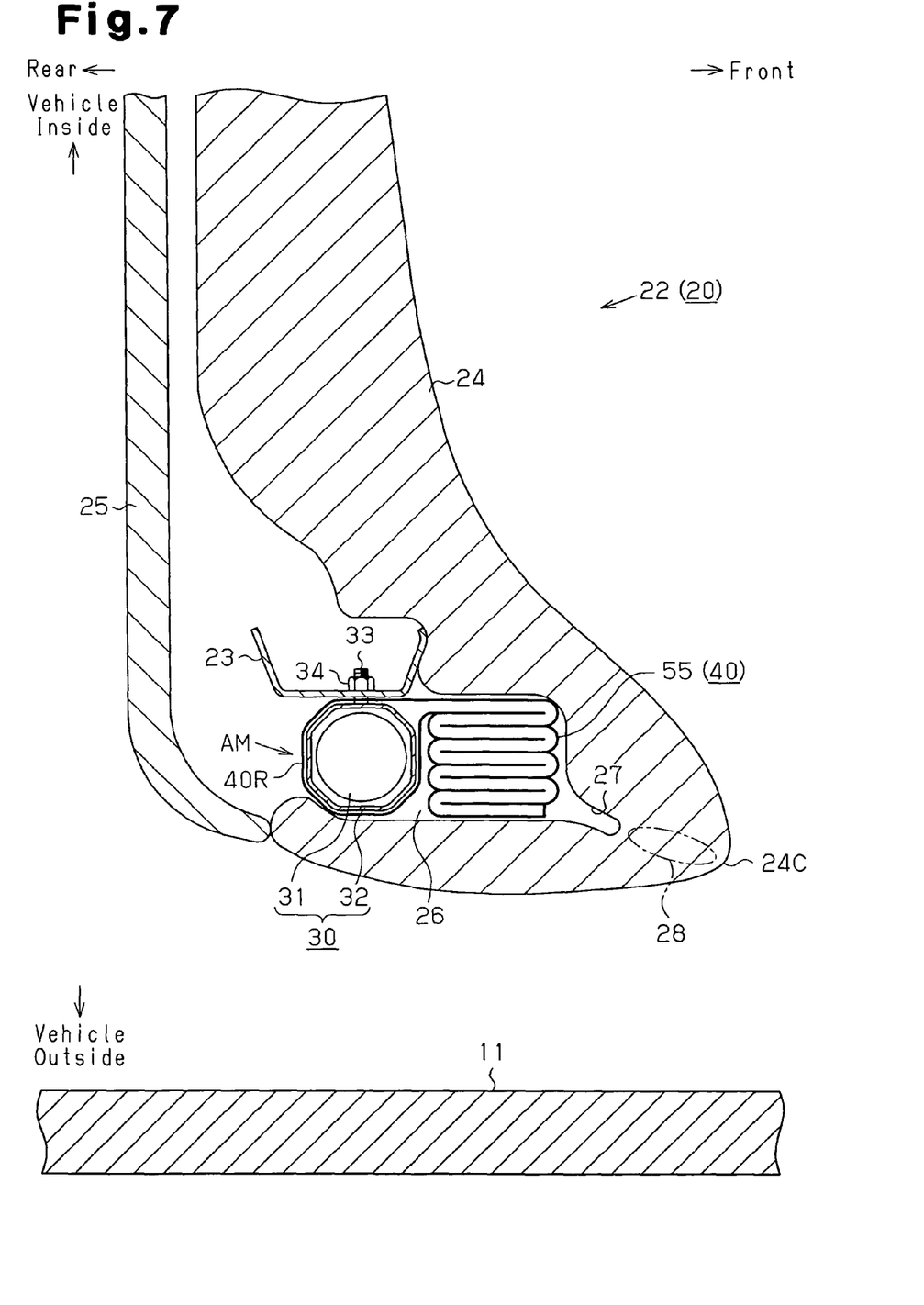
FIG. 7 is a partial cross-sectional plan view showing, together with the side door, the airbag module incorporated in the storage portion of the backrest.

The backrest 22 incorporates a seat frame, which serves as a framework. As shown in FIG. 7, a part of the seat frame is located in a vehicle outer side portion of the backrest 22. A part of the seat frame shown in FIG. 7 (hereinafter, referred to as a side frame portion 23) is formed by bending a metal plate. A seat pad 24, which is made of an elastic material such as urethane foam, is arranged on the front side of the seat frame including the side frame portions 23. A rigid back board 25, which is made of synthetic resin, is arranged on the rear side of the seat frame. The seat pad 24 is covered with a cover sheet (not shown).

A storage portion 26 is provided in the seat pad 24 at a position in the vicinity of the vehicle outer side of the side frame portion 23. The storage portion 26 is located diagonally behind and in the vicinity of the occupant P seated in the vehicle seat 20 (refer to FIG. 3). An airbag module AM, which forms a main part of the side airbag apparatus, is located in the storage portion 26.

A slit 27 extends diagonally forward and outward from the outer and front corner of the storage portion 26. A part between a front corner 24C of the seat pad 24 and the slit 27 (the area surrounded by an alternate long and two short dashes line in FIG. 7) forms a breakable portion 28, which is broken by an airbag 40, which will be discussed below.

The airbag module AM, which is incorporated in the backrest 22, includes as its main components an inflator assembly 30 and the airbag 40.

Figure 4:
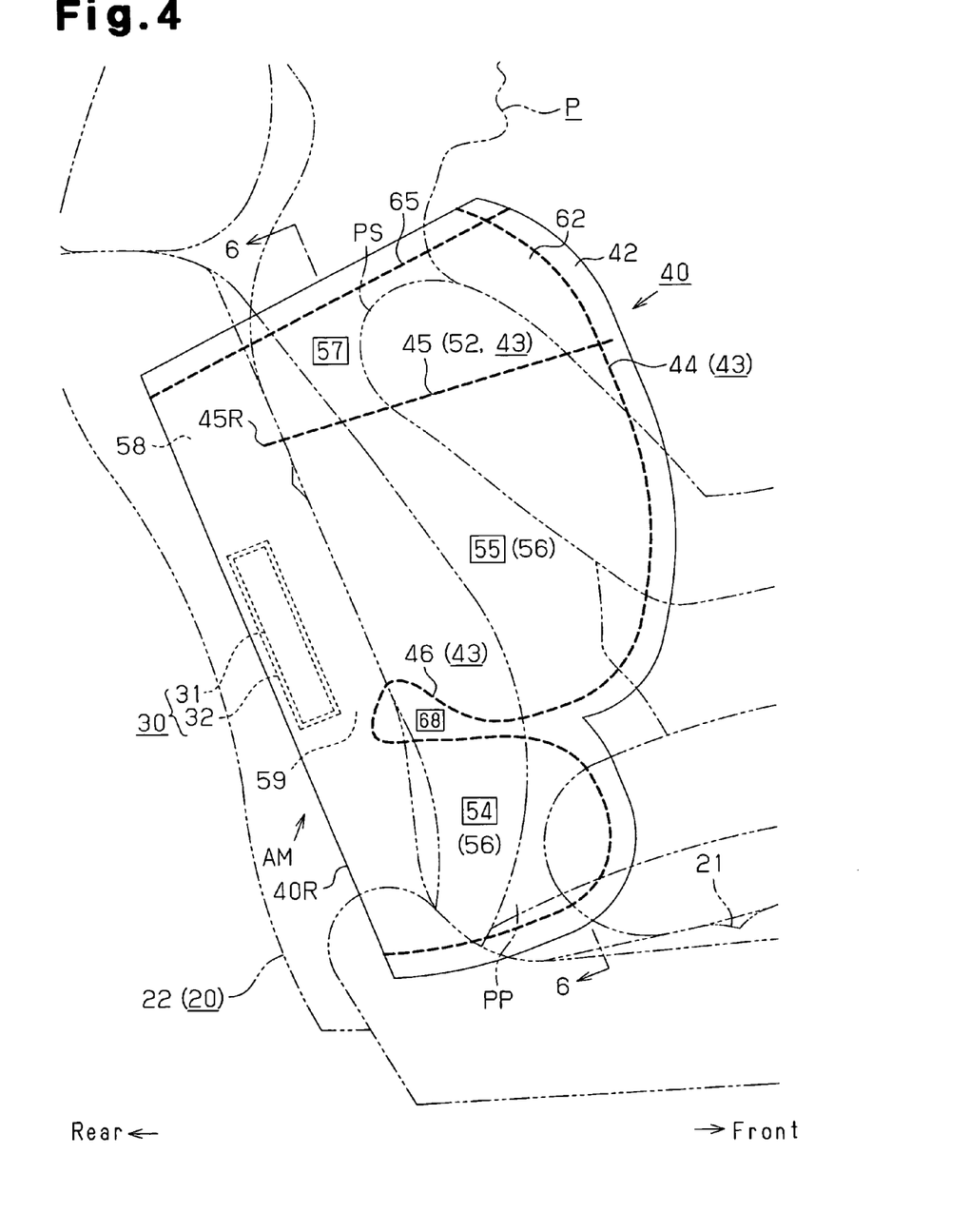
FIG. 4 is a partial side view illustrating an airbag module with the airbag deployed, together with the vehicle seat and the occupant.

Each of the components will now be described. In the present embodiment, the up-down direction and the front-rear direction of the components of the airbag module AM are defined with reference to the backrest 22 of the vehicle seat 20 as shown in FIG. 4. A direction along which the backrest 22 stands is defined as the up-down direction, and a direction along the thickness of the backrest 22 is defined as the front-rear direction. Since the backrest 22 is slightly inclined rearward in use, the up-down direction is not strictly the vertical direction, but corresponds to a slightly inclined direction. Likewise, the front-rear direction is not strictly a horizontal direction, but corresponds to a slightly inclined direction.

<Inflator Assembly 30>

As shown in FIGS. 4 and 7, the inflator assembly 30 includes a gas source, which is an inflator 31, and a retainer 32 mounted on the outer surface of the inflator 31. In the present embodiment, a pyrotechnic inflator is used as the inflator 31. The inflator 31 is substantially columnar and contains in it gas generating agent (not shown), which generates inflation gas. A harness (not shown), which is wiring for applying control signals to the inflator 31, is connected to one end of the inflator 31.

In place of the pyrotechnic inflator 31 using the gas generating agent, it is possible to use a hybrid type inflator, which breaks a partition wall of a high-pressure gas cylinder filled with a high-pressure gas by a low explosive so as to jet out gas.

On the other hand, the retainer 32 functions as a diffuser and secures the inflator 31 to the side frame portion 23 together with the airbag 40. Most part of the retainer 32 is a plate made of, for example, metal, and is formed to be substantially cylindrical through bending. A window (not shown) is formed in the retainer 32, and most of inflation gas ejected by the inflator 31 is discharged to the outside of the retainer 32 through the window.

The retainer 32 is fixed to the side frame portion 23 with securing members, which are a plurality of bolts 33. In other words, the inflator 31 is indirectly fixed by the bolts 33 with the retainer 32.

The inflator 31 and the retainer 32 of the inflator assembly 30 may be formed integrally.

<Airbag 40>

Figure 1:
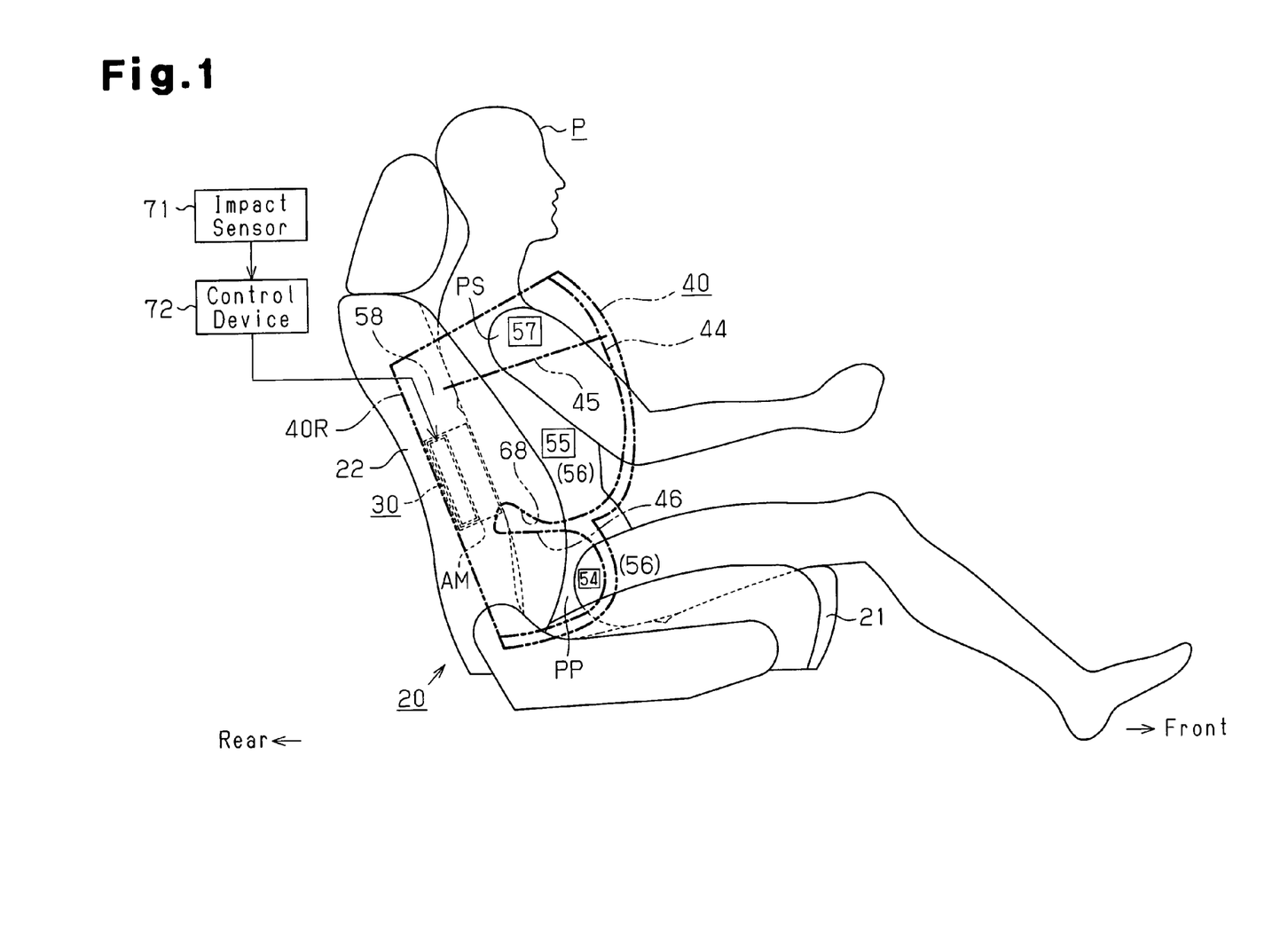
FIG. 1 is a side view of a side airbag apparatus according to one embodiment of the present invention, showing a vehicle seat equipped with the airbag apparatus, together with an occupant and an airbag.

As shown in FIGS. 1 to 3, when an impact of a side collision applied to the side door 11 from the side, the airbag 40 is inflated and deployed in a space between the occupant P seated in the vehicle seat 20 and the side door 11 by inflation gas from the inflator 31. The airbag 40 pops out substantially forward with a part thereof (rear section) remaining in the storage portion 26, and is inflated and deployed between the occupant P and the side door 11. The airbag 40 thus protects the occupant P from the impact of the side collision.

Figure 5:
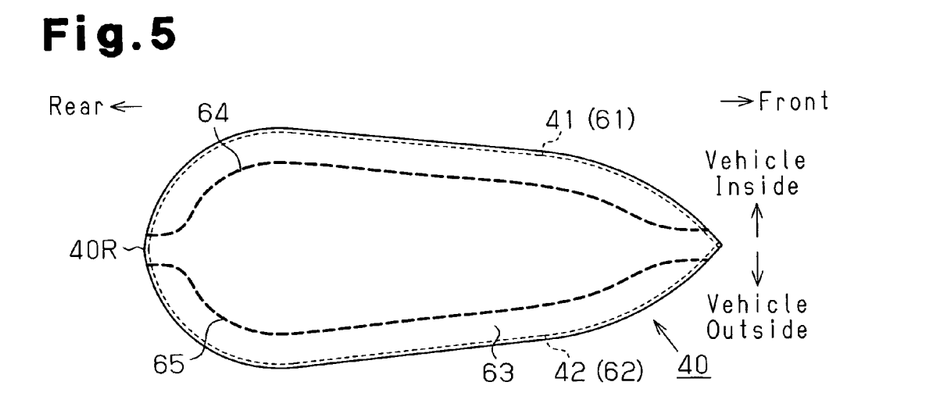
FIG. 5 is a plan view showing a ceiling portion of the airbag.
Figure 6:
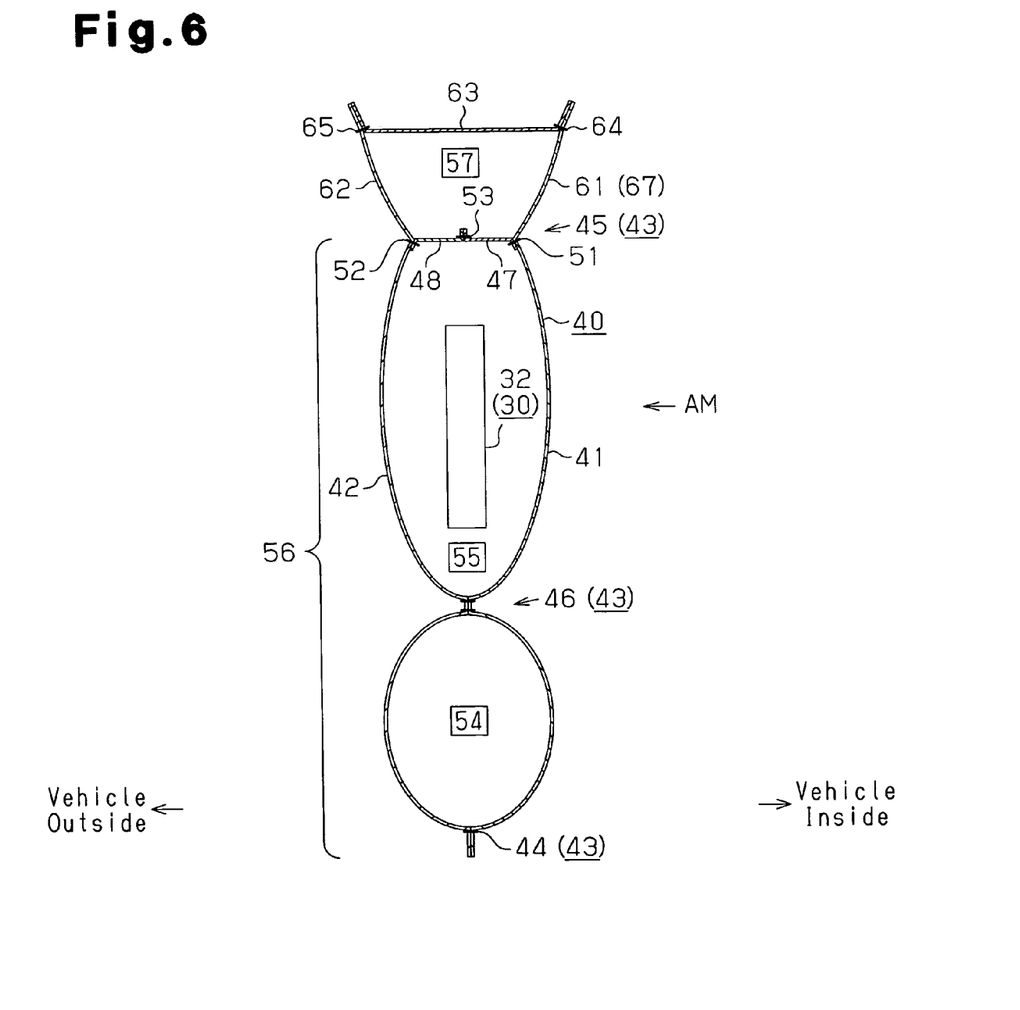
FIG. 6 is a cross-sectional view taken along line 6-6 of FIG. 4.

FIG. 4 shows, together with the occupant P and the vehicle seat 20, the airbag module AM in a state where the airbag 40 is spread flat without being filled with the inflation gas (spread state). FIG. 6 shows the cross-sectional structure along line 6-6 in FIG. 4. As shown in FIGS. 4 to 6, the airbag 40 is formed by a fabric panel, which is a single fabric sheet. That is, the airbag 40 is formed by folding the single fabric sheet in half at the center so that it overlaps with itself, and joining the overlapped portions. To distinguish two fabric portions, one of the fabric portions located on the vehicle inner side is defied as a fabric portion 41, and the other fabric portion located on the vehicle outer side is defined as a fabric portion 42.

As the material for the fabric portions 41 and 42, a material that has a high strength and flexibility and is easy to fold is preferable. For example, woven fabric made of polyester threads or polyamide threads is suitable. The shape and the size of the fabric portions 41, 42 are determined such that, when the airbag 40 is inflated and deployed between the vehicle seat 20 and the side door 11, the airbag 40 is located beside and the in the vicinity of the occupant P seated in the vehicle seat 20, and occupies a large region ranging from the lumbar region PP to the shoulder PS.

The airbag 40 may be formed by a pair of independent fabric portions. In this case, the airbag 40 is formed by joining the fabric portions.

The fabric portions 41, 42 are joined to each other at a joint portion 43, which includes a peripheral joint portion 44, an upper partition portion 45, and a lower partition portion 46. A space that is between the fabric portions 41, 42 and surrounded by the joint portions 43 (the inner space of the airbag 40) is a section that is designed to be inflated by inflation gas. In the present embodiment, the joint portion 43 is formed by sewing the fabric portions 41, 42 together with sewing threads. In FIG. 4, the joint portion 43, which is formed by sewing, is shown by a thick broken line. The joint portion 43 may be formed by a method other than sewing using sewing threads as shown above, but may be formed by, for example, using an adhesive.

The peripheral joint portion 44 occupies most part of the joint portion 43. The peripheral joint portion 44 joins the fabric portions 41, 42 to each other in a peripheral portion except for the boundary between the fabric portions 41 and 42 (folded-back part).

The lower partition portion 46 is located inside of the peripheral joint portion 44 so as to extend in the front-rear direction. Specifically, the lower partition portion 46 extends substantially rearward from the front lower end of the fabric portions 41, 42. The rear end of the partition portion 46 is located at a position slightly spaced forward from a rear end 40R of the airbag 40.

The upper partition portion 45 is located inside of the peripheral joint portion 44 so as to extend in the front-rear direction. Specifically, the upper partition portion 45 extends substantially rearward from the front upper end of the fabric portions 41, 42. The upper partition portion 45 joins the fabric portions 41, 42 to each other with the fabric portions 41, 42 spaced apart in the vehicle widthwise direction. The partition portion 45 is also referred to as a tether. The partition portion 45 includes a pair of constituent pieces 47, 48 arranged along the vehicle widthwise direction. Like the fabric portions 41, 42 of the airbag 40, each of the constituent pieces 47, 48 is formed by fabric and has an elongated shape extending in the front-rear direction.

The constituent piece 47 on the vehicle inner side is joined to the fabric portion 41 on the vehicle inner side at a lower joint portion 51, which is located at the lower end of the constituent piece 47 and extends in the front-rear direction. Also, the constituent piece 48 on the vehicle outer side is joined to the fabric portion 42 on the vehicle outer side at a lower joint portion 52, which is located at the lower end of the constituent piece 48 and extends in the front-rear direction. Further, the constituent pieces 47, 48 are joined to each other at an upper joint portion 53, which is located at the upper edges of the constituent pieces 47, 48 and extends in the front-rear direction.

In the present embodiment, the lower joint portions 51, 52 and the upper joint portion 53 are formed by sewing with sewing threads. In this manner, the upper partition portion 45 formed by the constituent pieces 47, 48 extends between the upper portions of the fabric portions 41 and 42 of the airbag 40.

The upper and lower partition portions 45, 46 are different from the peripheral joint portion 44, which simply joins the fabric portions 41, 42 to each other. The upper and lower partition portions 45, 46 have a function of joining the fabric portions 41, 42 to each other, while dividing the inner space of the airbag 40.

That is, a part of the airbag 40 that is below the partition portion 46 is a lumbar region protecting portion 54, which is inflated and deployed mainly in the vicinity of the outer side of the lumbar region PP of the occupant P, so as to protect the lumbar region PP. A part of the airbag 40 that is between the upper and lower partition portion 45 and 46 is a thorax protecting portion 55 that is inflated and deployed mainly beside and in the vicinity of the thorax PT (see FIGS. 2 and 3) of the occupant, so as to protect the thorax PT. The lumbar region protecting portion 54 and the thorax protecting portion 55 both correspond to a lower region protecting portion 56 in the CLAIMS. The lumbar region protecting portion 54 and the thorax protecting portion 55 are allowed to communicate with each other by a lower communication portion 59 located between the rear end 40R of the airbag 40 and the rear end of the partition portion 46. The communication portion 59 allows inflation gas to flow between the lumbar region protecting portion 54 and the thorax protecting portion 55.

A part of the airbag 40 that is above the partition portion 45 is a shoulder protecting portion 57. The shoulder protecting portion 57 is inflated and deployed on the inner side and in the vicinity of the top 16 (see FIG. 2) of the door trim 14 of the side door 11, so as to protect the shoulder PS. The shoulder protecting portion 57 is the highest part of the airbag 40.

In other words, the upper partition portion 45 divides the airbag 40 into the shoulder protecting portion 57 and the lower region protecting portion 56 therebelow (the thorax protecting portion 55 and the lumbar region protecting portion 54).

A communication portion 58 is provided in the partition portion 45. The communication portion 58 allows the shoulder protecting portion 57 and the lower region protecting portion 56 (the thorax protecting portion 55) to communicate with each other and allows inflation gas to flow therethrough. The communication portion 58 is located rearward of a part of the partition portion 45 that is beside the shoulder PS of the occupant P. In the present embodiment, the communication portion 58 is located at a rear end 45R of the upper partition portion 45. More specifically, the front ends of the constituent pieces 47, 48 are located at the upper front ends of the fabric portions 41, 42, and the rear end 45R is spaced forward from the upper rear ends of the fabric portions 41, 42 (the rear end 40R of the airbag 40). The communication portion 58 is formed between the rear end 45R of the constituent pieces 47, 48 and the upper rear end of the fabric portions 41, 42.

When inflated with the inflation gas, the shoulder protecting portion 57 includes, in addition to the partition portion 45, an inner wall portion 61 on the vehicle inner side, an outer wall portion 62 on the vehicle outer side, and a ceiling portion 63. The partition portion 45 forms the bottom of the shoulder protecting portion 57. The inner wall portion 61 forms a vehicle inner side portion of the shoulder protecting portion 57. The inner wall portion 61 is inclined such that it leans inward of the vehicle, and connected at the lower end to the end of the partition portion 45 on the vehicle inner side. The outer wall portion 62 forms a vehicle outer side portion of the shoulder protecting portion 57. The outer wall portion 62 is inclined such that it leans outward of the vehicle, and connected at the lower end to the end of the partition portion 45 on the vehicle outer side. Accordingly, the space between the inner wall portion 61 and the outer wall portion 62 narrows toward the lower end. The ceiling portion 63 forms the ceiling of the shoulder protecting portion 57. The ceiling portion 63 extends between the upper ends of the inner wall portion 61 and the outer wall portion 62. The ceiling portion 63 generally has such a shape that its width in the vehicle widthwise direction (the vertical direction as viewed in FIG. 5) is gradually reduced toward the front end.

In the present embodiment, the inner wall portion 61 and the outer wall portion 62 are formed by a common member (fabric sheet). However, the ceiling portion 63 is formed by a member separate from that of the inner wall portion 61 and the outer wall portion 62. The ceiling portion 63 is joined to the upper edge of the inner wall portion 61 by a vehicle inner side joint portion 64 extending along the vehicle inner side peripheral portion of the ceiling portion 63. Also, the ceiling portion 63 is joined to the upper edge of the outer wall portion 62 by a vehicle outer side joint portion 65 extending along the vehicle outer side peripheral portion of the ceiling portion 63. In the present embodiment, the vehicle inner side joint portion 64 is formed by sewing the vehicle inner side periphery of the ceiling portion 63 and the upper edge of the inner wall portion 61. Likewise, the vehicle outer side joint portion 65 is formed by sewing the vehicle outer side periphery of the ceiling portion 63 and the upper edge of the outer wall portion 62. In FIG. 5, the vehicle inner side joint portion 64 and the vehicle outer side joint portion 65, which are formed by sewing, are shown by thick broken lines like the above described joint portion 43. Like the joint portion 43, the vehicle inner side joint portion 64 and the vehicle outer side joint portion 65 may be formed by a method other than sewing using sewing threads as shown above, but may be formed by, for example, using an adhesive.

As shown in FIG. 6, the shoulder protecting portion 57 is formed by the partition portion 45, the inner wall portion 61, the outer wall portion 62, and the ceiling portion 63. Accordingly, the cross-sectional shape of the shoulder protecting portion 57 as viewed from the front or rear of the vehicle 10 is substantially an inverted trapezoid. A vehicle inner side part of the inverted trapezoidal cross section is formed by the inner wall portion 61, and a vehicle outer side part is formed by the outer wall portion 62.

The shoulder protecting portion 57 is allowed to fall outward of the vehicle while pivoting on the partition portion 45. The state in which the shoulder protecting portion 57 falls in this manner can occur when the side door 11 bulges into the passenger compartment and pushes the airbag 40 in the same direction due to a side collision. In this state, the shoulder protecting portion 57 is prevented from moving into the passenger compartment by the shoulder PS of the occupant P. Accordingly, the shoulder protecting portion 57 falls outward of the vehicle while pivoting on the boundary (the partition portion 45), or a folding point, between the lower region protecting portion 56 (the thorax protecting portion 55).

Figure 9:
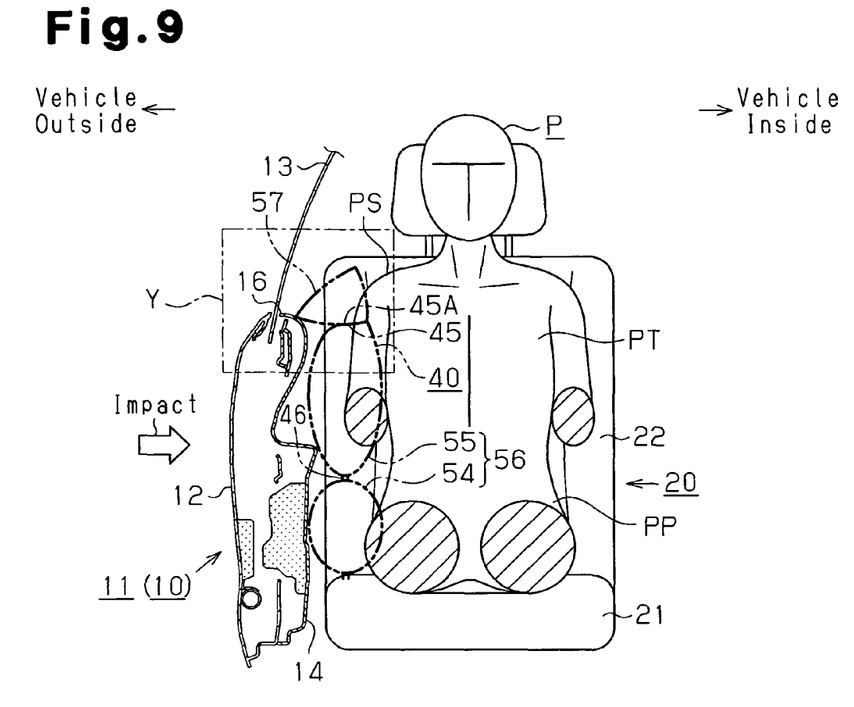
FIG. 9 is a cross-sectional front view showing the airbag of FIG. 2 in a state where the side door bulges into the passenger compartment due to a side collision.
Figure 10:
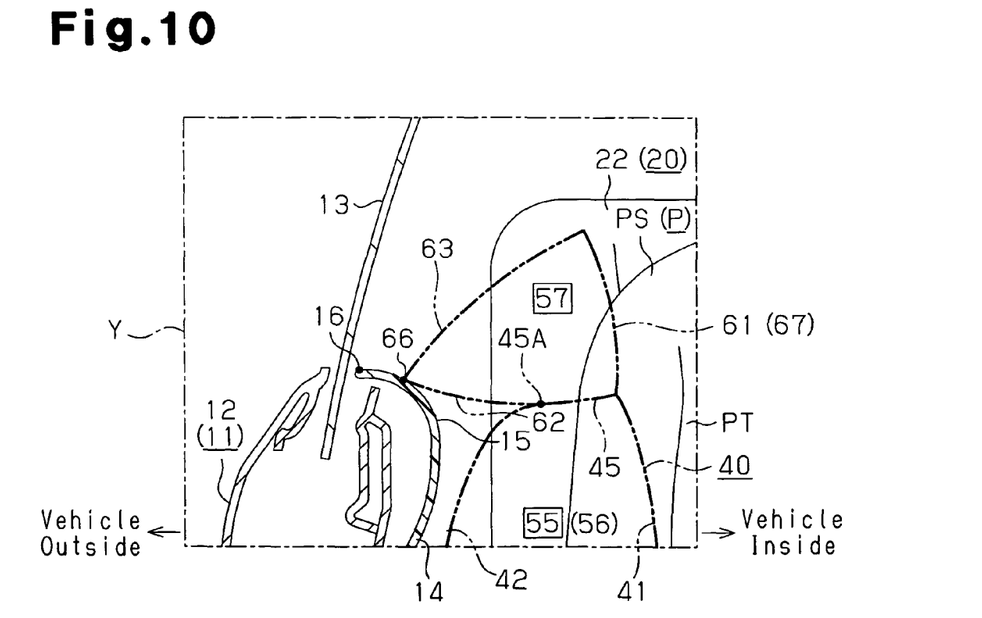
FIG. 10 is an enlarged cross-sectional front view illustrating region Y of FIG. 9.

As shown in FIGS. 9 and 10, the parts of the shoulder protecting portion 57 are formed to meet the following conditions.

Condition 1: When the shoulder protecting portion 57 in the inflated state falls inward of the vehicle while pivoting on the partition portion 45, a part of the outer wall portion 62 contacts a part of the door trim 14 that is inward of and below the top 16, so as to function as a support portion 66 that supports the shoulder protecting portion 57 to the door trim 14.

In the present embodiment, the upper end of the outer wall portion 62 is configured to function as the support portion 66.

Condition 2: When the shoulder protecting portion 57 is supported by the support portion 66, at least a part of the inner wall portion 61 is located above the top 16 of the door trim 14 and contacts the shoulder PS of the occupant P at a position inward of an end 45A of the partition portion 45 on the vehicle outer side, thereby functioning as a shoulder receiving portion 67, which receives the shoulder PS.

As shown in FIG. 4, an elongated part of the fabric portions 41, 42 that is surrounded by the lower partition portion 46 and extends in the front-rear direction is a non-inflation portion 68 that does not receive inflation gas and thus is not inflated.

As shown in FIGS. 4 and 7, the inflator assembly 30 is arranged in a rear part of the thorax protecting portion 55, so as to extend substantially in the up-down direction. A plurality of bolts 33 of the retainer 32 are passed through the fabric portion 41 on the vehicle inner side. The insertion secures the inflator assembly 30, while determining the position of the inflator assembly 30 with respect to the airbag 40.

As shown in FIG. 7, the airbag module AM, which includes as main components the airbag 40 and the inflator assembly 30, is made compact by folding the spread airbag 40 (refer to FIG. 4) into a storage state. The airbag module AM is folded in this manner in order that it can be readily accommodated in the storage portion 26 having a limited size in the backrest 22.

The airbag module AM in the storage state is arranged in the storage portion 26 of the backrest 22, with the inflator assembly 30 being located at the rear and most of the airbag 40 being located at the front. Then, as described above, the bolts 33, which extend from the retainer 32 and are passed through the airbag 40, are passed through the side frame portion 23 and fastened with nuts 34. The fastening fixes the inflator assembly 30 to the side frame portion 23 together with the airbag 40. The inflator assembly 30 may be fixed to the vehicle 10 (the side frame portion 23) by members other than the bolts 33 and the nuts 34.

As shown in FIG. 1, the side airbag apparatus includes an impact sensor 71 and a control device 72 in addition to the above described airbag module AM. The impact sensor 71 is configured by an acceleration sensor, and is provided in the body side portion of the vehicle 10. The impact sensor 71 detects impact applied from the side of the body side portion. The body side portion refers to members that are located in a side of the vehicle 10, mainly doors and pillars. For example, part of the body side portion corresponding to the front seat includes a front door and a center pillar (B-pillar). Part of the body side portion corresponding to the backseat includes a rear part of the rear door, a C-pillar, a front part of the wheel well, and a rear quarter. The above described side door 11 is included in the body side portion. The control device 72 controls the operation of the inflator 31 based on a detection signal from the impact sensor 71.

The side airbag apparatus of the present embodiment is constructed as described above. In this side airbag apparatus, when an impact the magnitude of which is greater than or equal to a predetermined value is applied to the side door 11 of the vehicle 10 due to a side collision, the impact sensor 71 detects the impact. In response to the detection signal, the control device 72 outputs a command signal for actuating the inflator 31 to the inflator 31. In response to the command signal, the gas generating agent in the inflator 31 generates inflation gas G, which is then supplied to the airbag 40. The inflation gas is supplied to the lower region protecting portion 56 (the lumbar region protecting portion 54 and the thorax protecting portion 55) and the shoulder protecting portion 57. The inflation gas is supplied from the lower region protecting portion 56 to the shoulder protecting portion 57 through the communication portion 58. The pressure of the inflation gas acts on each part of the airbag 40, which is folded into the storage state. The airbag 40 then starts inflating in the backrest 22 to be unfolded.

Figure 8:
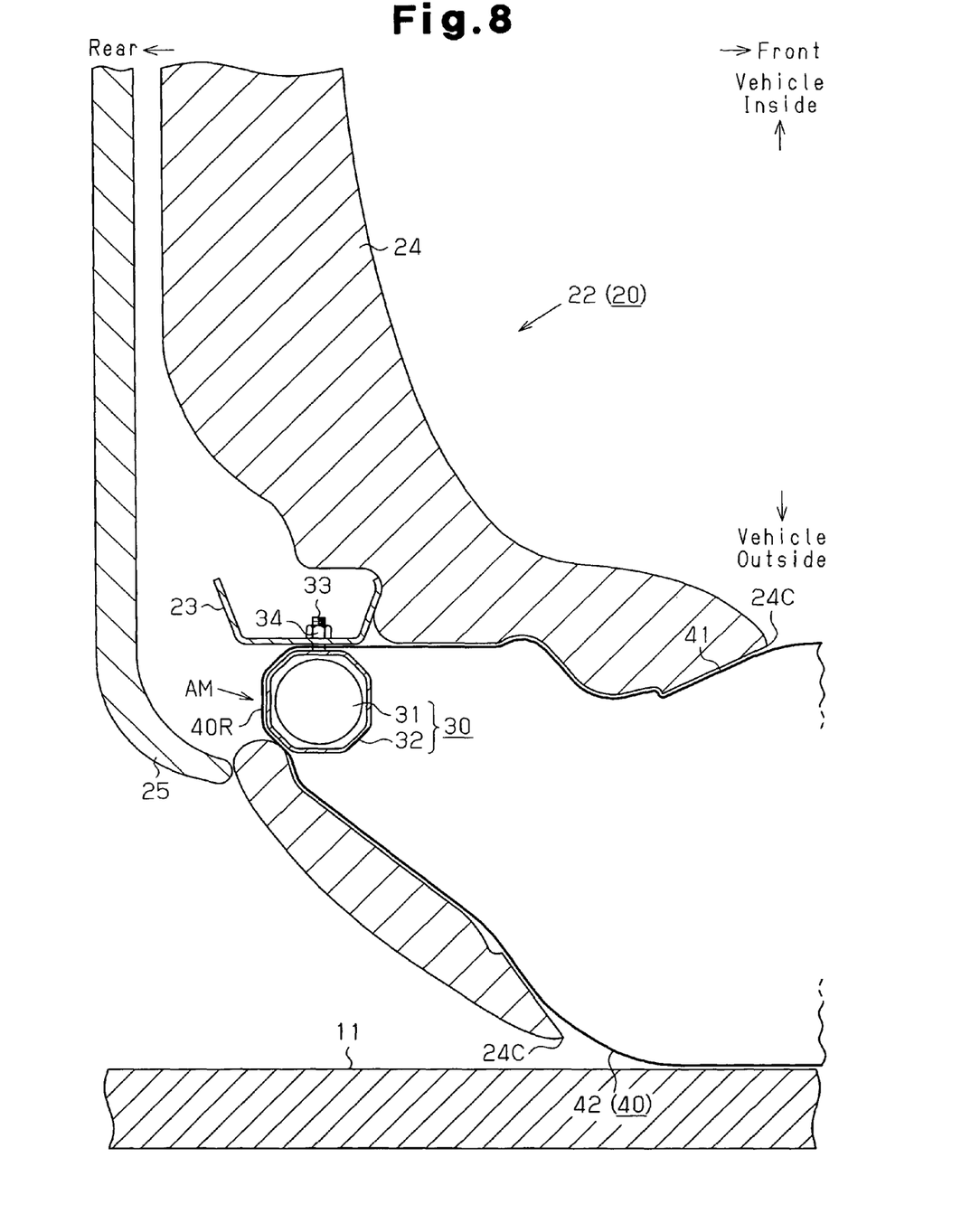
FIG. 8 is a partial cross-sectional plan view showing a state in which the airbag of FIG. 7 has popped out of the backrest and been inflated and deployed.

As the airbag 40 is inflated and deployed while being unfolded, the seat pad 24 of the backrest 22 is pressed by the airbag 40 and is eventually broken at the breakable portion 28 (refer to FIG. 7). The airbag 40 pops out from the backrest 22 through the broken part, with a part in the vicinity of the inflator assembly 30 remaining in the backrest 22 as shown in FIG. 8.

Thereafter, the airbag 40 is deployed while being inflated toward the front of the vehicle 10 in a space between the occupant P (omitted in FIG. 8) and the side door 11, which is bulging into the passenger compartment. At this time, as shown in FIG. 2, the lumbar region protecting portion 54 is deployed while being inflated in a space between the side door 11 and the lumbar region PP of the occupant P. The thorax protecting portion 55 is deployed while being inflated between the side door 11 and the thorax PT, and the shoulder protecting portion 57 is deployed while being inflated between the side door 11 (beside and in the vicinity of the top 16 of the door trim 14) and the shoulder PS. The protecting portions 54, 55, 57 reduce the impact due to the side collision transmitted to the lumbar region PP, the thorax PT, and the shoulder PS of the occupant P through the side door 11, respectively.

When the side door 11 bulges into the passenger compartment due to an impact from the side, the airbag 40 is pushed in the same direction. At this time, the shoulder protecting portion 57 is prevented from moving into the passenger compartment by the shoulder PS of the occupant P. Accordingly, the shoulder protecting portion 57 falls outward of the vehicle while pivoting on the boundary (the partition portion 45) between the lower region protecting portion 56 (the thorax protecting portion 55).

When the shoulder protecting portion 57 and the lower region protecting portion 56 are inflated by inflation gas, the inflation gas flows through the communication portion 58 provided in the partition portion 45 (refer to FIG. 4). When the shoulder protecting portion 57 and the lower region protecting portion 56 are inflated, the thickness of the boundary between the shoulder protecting portion 57 and the lower region protecting portion 56, and the thickness of the surrounding portion in the vehicle widthwise direction are limited by the partition portion 45. However, the thickness in the vehicle widthwise direction of a part of the partition portion 45 where the communication portion 58 is located is less likely to be limited compared to a case where the communication portion 58 is not provided. Therefore, a part of the partition portion 45 where the communication portion 58 is provided has a greater thickness in the vehicle widthwise direction than parts where the partition portion 45 is not provided. If this part with a great thickness in the vehicle widthwise direction is located beside the shoulder PS, the shoulder protecting portion 57 is pushed by the side door 11 bulging into the passenger compartment and contacts the shoulder PS. The shoulder protecting portion 57 contacting the shoulder PS is less likely to fall outward of the vehicle.

On the other hand, the shoulder PS is generally located at a position corresponding to the front portion of the inflated and deployed airbag 40 or in the vicinity thereof (see FIG. 4). In this regard, the communication portion 58 of the present invention increases the thickness in the vehicle widthwise direction of a part that is located rearward of a part of the partition portion 45 that is beside the shoulder PS. Therefore, compared to a case where the communication portion 58 is located beside the shoulder PS, the shoulder protecting portion 57 is more likely to fall outward of the vehicle.

Particularly, as long as the communication portion 58 is located rearward of a part of the partition portion 45 that is beside the shoulder PS, the communication portion 58 is provided at the rear end 45R of the partition portion 45, which is farthest from the shoulder PS in the present embodiment. Thus, the influence of the communication portion 58 on the likelihood of falling of the shoulder protecting portion 57 is minimized.

When the shoulder protecting portion 57 falls outward of the vehicle as described above, a part of the outer wall portion 62 that forms a vehicle outer side part in the substantially inverted triangular cross section functions as the support portion 66. More specifically, the upper end of the outer wall portion 62 functions as the support portion 66. The falling motion of the shoulder protecting portion 57 outward of the vehicle is stopped when the upper end (the support portion 66) of the shoulder protecting portion 57 contacts the door trim 14 from above. In the shoulder protecting portion 57 in the stopped state, a part that is inside of and below the top 16 of the door trim 14 contacts the support portion 66 at a point or along a line. The contact causes the door trim 14 to be located on the vehicle outer side of the support portion 66, so that the support portion 66 is prevented from moving outward of the vehicle by the door trim 14.

As described above, the shoulder protecting portion 57 falls and is supported by the door trim 14 at the support portion 66. In the shoulder protecting portion 57 in this state, the inner wall portion 61, which constitutes the vehicle outer side part of the inverted triangular cross-section functions as the shoulder receiving portion 67. At this time, most of the shoulder protecting portion 57 is located above the top 16 of the door trim 14. The shoulder receiving portion 67 contacts the shoulder PS of the occupant P at a position inward of the outer end 45A of the partition portion 45. Therefore, the shoulder PS of the occupant P, which is located above the top 16 of the door trim 14, is received by the shoulder receiving portion 67.

The present embodiment described above has the following advantages.

(1) The shoulder protecting portion 57 has parts that function as the support portion 66 and the shoulder receiving portion 67. When the inflated shoulder protecting portion 57 falls outward of the vehicle while pivoting on the partition portion 45, the shoulder protecting portion 57 contacts a part that is inward of and below the top 16 of the door trim 14. In the shoulder protecting portion 57, a part that contacts the door trim 14 functions as the support portion 66 (see FIG. 10). Therefore, compared to a case where the shoulder protecting portion 57 contacts the top 16 of the door trim 14, the shoulder protecting portion 57 is less likely to be moved to the vehicle outer side of the door trim 14, that is, away from the shoulder PS.

When the shoulder protecting portion 57 is supported by the door trim 14 at the support portion 66, at least a part of the shoulder protecting portion 57 functions as the shoulder receiving portion 67 (see FIG. 10). The shoulder receiving portion 67 is located above the top 16 of the door trim 14 and contacts the shoulder PS of the occupant P at a position inward of the outer end 45A of the partition portion 45, so as to receive the shoulder PS. Thus, by receiving the shoulder PS of the occupant P with the shoulder receiving portion 67, the shoulder PS is reliably protected from the side door 11 bulging, into the passenger compartment.

(2) When viewed from the front or rear of the vehicle 10, the shoulder protecting portion 57 substantially has an inverted trapezoidal cross section (see FIGS. 2 and 10). Therefore, a part of the outer portion of the inverted trapezoidal cross section functions as the support portion 66. Accordingly, the shoulder protecting portion 57 reliably contacts a part that is inward of and below the top 16 of the door trim 14. Also, a part of the inner portion of the inverted trapezoidal cross section functions as the shoulder receiving portion 67. This allows at least a part of the shoulder receiving portion 67 to be located above the top 16 of the door trim 14. Also, at least a part of the shoulder receiving portion 67 is allowed to contact the shoulder PS of the occupant P at a position inward of the outer end 45A of the partition portion 45. Therefore, the advantage of the above item (1) is reliably achieved.

(3) The shoulder protecting portion 57 is formed by the partition portion 45, the inner wall portion 61, the outer wall portion 62, and the ceiling portion 63. These portions 45, 61, 62, and 63 form the shoulder protecting portion 57, which has an inverted trapezoidal cross section.

(4) The ceiling portion 63 is formed by a member separate from that of the inner wall portion 61 and the outer wall portion 62. The ceiling portion 63 is joined at its periphery to the upper edge of the inner wall portion 61 and the upper edge of the outer wall portion 62 (see FIG. 6). Therefore, compared to a case where the ceiling portion 63 is formed by the same member as the inner wall portion 61 and the outer wall portion 62, the shoulder protecting portion 57 having a complex cross section of an inverted trapezoid can be formed relatively easily.

(5) The support portion 66 is formed by the upper end of the outer wall portion 62 (see FIG. 10). Therefore, the shoulder protecting portion 57 is allowed to contact at a point or along a line a part that is inside and below the top 16 of the door trim 14 in the support portion 66. The contact reliably limits the outward movement of the support portion 66, so that the shoulder PS is reliably received and protected by the shoulder receiving portion 67.

(6) The airbag 40 is formed by a pair of the fabric portions 41, 42 joined to each other at the peripheries. The partition portion 45 is located between the fabric portions 41 and 42 and inward of the peripheral joint portion 44, so as to extend in the front-rear direction. Also, the partition portion 45 is formed by the partition portion 45 (tether) that joins the fabric portions 41, 42 to each other with the fabric portions 41, 42 spaced apart in the vehicle widthwise direction (see FIG. 6). Therefore, although the airbag 40 has a simple structure in which the partition portion 45 extends between the fabric portions 41 and 42, the partition portion 45, which defines the shoulder protecting portion 57 and the lower region protecting portion 56, is formed in a reliable manner.

(7) The communication portion 58 connects the shoulder protecting portion 57 and the lower region protecting portion 56 to each other, and functions as a passage for inflation gas. The communication portion 58 is located rearward of a part of the partition portion 45 that is beside the shoulder PS (see FIG. 4). Therefore, compared to a case where the communication portion 58 is located beside the shoulder PS, the shoulder protecting portion 57 is more likely to fall outward of the vehicle.

(8) The communication portion 58 is located in the rear end 45R of the partition portion 45 (see FIG. 4). Thus, the influence of the communication portion 58 on the likelihood of falling of the shoulder protecting portion 57 is minimized. As a result, the shoulder protecting portion 57 is allowed to easily fall at a position beside the shoulder PS.

The present invention may be embodied in the following forms.

<Regarding Shoulder Protecting Portion 57>

Figure 11:
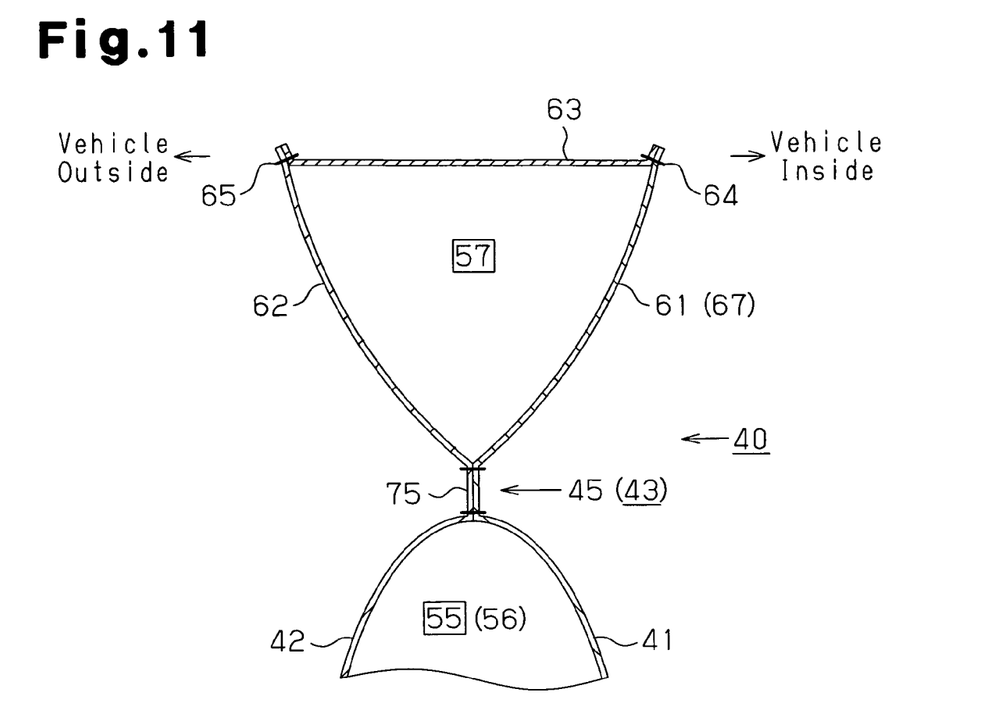
FIG. 11 is a partially enlarged vertical cross-sectional view illustrating a shoulder protecting portion and parts surrounding it according to a modified embodiment.

As shown in FIG. 11, the shoulder protecting portion 57 may have an inverted triangular cross section as viewed from the front or rear of the vehicle 10. Specifically, the shoulder protecting portion 57 is formed by the inner wall portion 61, the outer wall portion 62, and the ceiling portion 63. The inner wall portion 61 forms a vehicle inner side portion of the shoulder protecting portion 57, and the outer wall portion 62 forms a vehicle outer side portion of the shoulder protecting portion 57. The inner wall portion 61 and the outer wall portion 62 are formed such that the space therebetween narrows toward the lower end. The ceiling portion 63 extends between the upper ends of the inner wall portion 61 and the outer wall portion 62. In the above embodiment, the shoulder protecting portion 57 can be formed by joining the fabric portions 41, 42, for example, by sewing with the vehicle inner side fabric portion 41 and the vehicle outer side fabric portion 42 contacting each other.

If formed in this manner, the shoulder protecting portion 57 starts falling outward of the vehicle while pivoting on the partition portion 45 due to a side collision. Then, a part of the outer wall portion 62 functions as the support portion 66 and reliably contacts a part that is inward of and below the top 16 of the door trim 14. The inner wall portion 61 functions as the shoulder receiving portion 67. At least a part of the inner wall portion 61 is located above the top 16 of the door trim 14, and reliably contacts the shoulder PS of the occupant P at a position inward of the outer end of the partition portion 45 (substantially, the partition portion 45). Therefore, the shoulder protecting portion having a substantially inverted triangular cross section has similar advantages as the shoulder protecting portion 57 having a substantially inverted trapezoidal cross section.

When the shoulder protecting portion 57 having a substantially inverted triangular cross section as described above is used, the ceiling portion 63 is preferably formed by a member separate from the inner wall portion 61 and the outer wall portion 62, as in the case of the shoulder protecting portion 57 having a substantially inverted trapezoidal cross section. Also, the periphery of the ceiling portion 63 is preferably joined to the upper edges of the inner wall portion 61 and the outer wall portion 62. In this case, compared to a case where the ceiling portion 63 is formed by the same member as the inner wall portion 61 and the outer wall portion 62, the shoulder protecting portion 57 having a complex cross section of an inverted triangle can be formed relatively easily.

The support portion 66 may be formed by a portion in the vicinity of the upper end of the outer wall portion 62. For example, when the inflated shoulder protecting portion 57 falls outward of the vehicle while pivoting on the partition portion 45, and a portion in the vicinity of the upper end of the shoulder protecting portion 57 contacts and is stopped by the door trim 14 while being deformed, a portion in the vicinity of the upper end of the outer wall portion 62 may function as the support portion 66. In this case also, as in the case where the upper end of the shoulder protecting portion 57 functions as the support portion 66, the shoulder protecting portion 57 is allowed to contact, at a point or along a line, a part that is inside and below the top 16 of the door trim 14 in the support portion 66. The contact reliably limits the outward movement of the support portion 66, so that the shoulder PS is reliably received and protected by the shoulder receiving portion 67.

The ceiling portion 63 may be formed by the same member, for example, the same fabric sheet, as at least one of the inner wall portion 61 and the outer wall portion 62. Specifically, the ceiling portion 63, the inner wall portion 61, and the outer wall portion 62 may be formed integrally by the same member.

The configuration of the shoulder receiving portion 67 of the shoulder protecting portion 57 may be changed as necessary as long as at least part of the shoulder receiving portion 67 is located above the top 16 of the door trim 14. Specifically, the entire shoulder receiving portion 67 may be located above the top 16. Alternatively, only a small part of the shoulder receiving portion 67 may be located above the top 16.

In the case where the shoulder protecting portion 57 has a substantially inverted triangular cross section as viewed from the front or rear of the vehicle 10, the cross-sectional shape of the shoulder protecting portion 57 may be any triangle such as an inverted regular triangle and an isosceles triangle.

The cross-sectional shape of the shoulder protecting portion 57 as viewed from the front or rear of the vehicle may be different from a substantially inverted trapezoid or a substantially inverted triangle as long as the space in the vehicle widthwise direction narrows toward the lower end.

<Regarding Partition Portion 45>

In the case where the airbag 40 is formed by a pair of the fabric portions 41, 42, which are joined to each other at the peripheries, the upper partition portion 45 may be formed by a member called a seam. The partition portion 45 is located inside of the peripheral joint portion 44 so as to extend in the front-rear direction. The partition portion 45 joins the fabric portions 41, 42 to each other while causing them to contact each other. The partition portion 45 corresponds to a non-inflation portion 75 shown in FIG. 11 (discussed below) with a minimized length in the up-down direction.

In this case, although the airbag 40 has a simple structure in which the fabric portions 41, 42 are brought into contact and joined together, the partition portion 45, which defines the shoulder protecting portion 57 and the lower region protecting portion 56, is reliably formed. According to this joint can be achieved, for example, by sewing the fabric portions 41, 42 to each other while bringing them into contact.

As shown in FIG. 11, the partition portion 45 may separates the shoulder protecting portion 57 and the lower region protecting portion 56 from each other. Between the protecting portions 57, 56, the fabric portions 41, 42 are joined together while being brought into contact with each other. The part between the shoulder protecting portion 57 and the lower region protecting portion 56 may be used as the non-inflation portion 75, which is neither supplied with inflation gas nor inflated.

This configuration separates the shoulder protecting portion 57 and the lower region protecting portion 56 from each other with the non-inflation portion 75 in between. This prevents the inflated shoulder protecting portion 57 and the inflated lower region protecting portion 56 from contacting each other. As a result, when the side door 11 bulges into the passenger compartment, the shoulder protecting portion 57 is likely to fall outward of the vehicle while pivoting on the partition portion 45.

<Regarding Communication Portion 58>

The position of the communication portion 58 may be different from that shown in the above embodiment (rear end) as long as it is located rearward of a position beside a part of the partition portion 45 that is beside the shoulder PS. In this case, the communication portion 58 may be located at a middle portion in the front-rear direction of the partition portion 45.

<Regarding Lower Region Protecting Portion 56>

Parts of the side of the occupant P to be protected by the lower region protecting portion 56 may be any parts that are below the shoulder PS. As long as this condition is met, the structure of the lower region protecting portion 56 may be changed. Thus, for example, the lumbar region protecting portion 54 of the above embodiment may be omitted so that only the thorax protecting portion 55 forms the lower region protecting portion 56. Alternatively, the lower region protecting portion 56 may be changed to include a part that corresponds to at least one of the thorax PT, the abdomen, and the lumbar region PP.

<Other Modifications>

The inflator assembly 30 may be located outside of the airbag 40. In this case, the inflator 31 and the airbag 40 may be connected to each other with a pipe, so that inflation gas is supplied to the airbag 40 from the inflator 31 through the pipe.

Instead of the backrest 22 of the vehicle seat 20, the storage portion 26 may be provided in the body side portion. The airbag module AM may be arranged in the storage portion 26.

The upper communication portion 58 (see FIG. 4) may be provided with a valve that allows inflation gas to flow from the thorax protecting portion 55 to the shoulder protecting portion 57, while restricting the reverse flow.

In this case, when the side door 11 bulges into the passenger compartment at a side collision, and the inflated and deployed thorax protecting portion 55 is pressed against the thorax PT of the occupant P, the valve functions to adjusts the inner pressure of the thorax protecting portion 55. That is, while allowing the inflation gas to flow from the thorax protecting portion 55 to the shoulder protecting portion 57, the valve prevents the inflation gas that has flowed into the shoulder protecting portion 57 from flowing out (back) to the thorax protecting portion 55. Since the inflation gas flows from the thorax protecting portion 55 to the shoulder protecting portion 57 while being prevented from flowing backward, the inner pressure of the thorax protecting portion 55 is lowered and the inner pressure of the shoulder protecting portion 57 is increased. This prevents the inner pressure of the thorax protecting portion 55 from being excessively increased when restraining the thorax PT.

The lower communication portion 59 (see FIG. 4) may be provided with a valve that allows inflation gas to flow from the thorax protecting portion 55 to the lumbar region protecting portion 54, while restricting the reverse flow.

In this case, the valve prevents the inflation gas that has flowed into the lumbar region protecting portion 54 from flowing out (back) to the thorax protecting portion 55 through the communication portion 59. Thus, the inner pressure of the lumbar region protecting portion 54 is increased to a level appropriate for protecting the lumbar region PP of the occupant P. Also, the inner pressure of the lumbar region protecting portion 54 is prevented from being lowered due to the outflow of the inflation gas from the lumbar region protecting portion 54 to the thorax protecting portion 55. Accordingly, the inner pressure of the lumbar region protecting portion 54 is maintained to an appropriate level.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus comprising:
an inflator that generates inflation gas in response to an impact applied to a vehicle from a side; and an airbag that is inflated in a space between an occupant seated in a vehicle seat and a side door of the vehicle by the inflation gas supplied by the inflator, wherein the airbag includes a shoulder protecting portion and a lower region protecting portion, which are defined by a partition portion that is located below a top of a door trim of the side door, wherein the shoulder protecting portion protects a shoulder of the occupant by being inflated in a space that is beside the shoulder and beside and in the vicinity of the door trim of the side door, wherein the lower region protecting portion protects a part below the shoulder of the occupant by being inflated in a space below the shoulder protecting portion, and wherein the shoulder protecting portion includes:

a support portion, wherein, when the shoulder protecting portion is inflated and falls outward of the vehicle while pivoting on the partition portion, the support portion contacts part of the shoulder protecting portion that is inward of the top of the door trim in the vehicle widthwise direction and below the top, thereby supporting the shoulder protecting portion; and a shoulder receiving portion, wherein, when the shoulder protecting portion is supported by the door trim at the support portion, the shoulder receiving portion is at least partly located above the top of the door trim and contacts the shoulder of the occupant at a position inward of the outer end of the partition portion in the vehicle widthwise direction, thereby receiving the shoulder.

2. The side airbag apparatus according to claim 1, wherein the shoulder protecting portion has a substantially inverted trapezoidal cross section or a substantially inverted triangular cross section as viewed from the front or rear of the vehicle.

3. The side airbag apparatus according to claim 2, wherein the shoulder protecting portion includes:

an inner wall portion that forms a part of the shoulder protecting portion on the vehicle inner side;

an outer wall portion that forms a part of the shoulder protecting portion on the vehicle outer side;

wherein the inner wall portion and the outer wall portion are formed such that the space therebetween narrows toward the lower ends of the inner and outer wall portions, and a ceiling portion extend between the upper end of the inner wall portion and the upper end of the outer wall portion.

4. The side airbag apparatus according to claim 3, wherein the ceiling portion is formed by a member separate from the inner wall portion and the outer wall portion, and wherein the ceiling portion is joined, at its periphery, to the upper edges of the inner wall portion and the outer wall portion.

5. The side airbag apparatus according to claim 2, wherein the support portion is formed by an upper end of a vehicle outer part of the cross-sectional shape or a part in the vicinity of the upper end.

6. The side airbag apparatus according to claim 1, wherein the airbag includes a fabric portion on a vehicle inner side and a fabric portion on a vehicle outer side, which are joined to each other by peripheral joint portion located at the peripheries of the fabric portions, and wherein the partition portion is formed by an inner joint portion that is located between the fabric portions and inside of the peripheral joint portion, and extends in a front-rear direction, the partition portion joining the fabric portions to each other in a state where the fabric portions are spaced apart from each other in the vehicle widthwise direction.

7. The side airbag apparatus according to claim 1, wherein the airbag includes a fabric portion on a vehicle inner side and a fabric portion on a vehicle outer side, which are joined to each other by peripheral joint portion located at the peripheries of the fabric portions, and wherein the partition portion is formed by an inner joint portion that is located inside of the peripheral joint portion, and extends in a front-rear direction, the partition portion joining the fabric portions to each other in a state where the fabric portions contact each other.

8. The side airbag apparatus according to claim 7, wherein the inner joint portion joins the fabric portions to each other in a state where the shoulder protecting portion and the lower region protection portions are spaced apart from each other in a vertical direction, and wherein the shoulder protecting portion and the lower region protecting portions are non-inflation portions.

9. The side airbag apparatus according to claim 1, wherein the partition portion has a communication portion that allows the shoulder protecting portion and the lower region protection portion to communicate with each other, and functions as a passage for the inflation gas, and wherein the communication portion is located rearward of a part of the partition portion that is beside the shoulder.

10. The side airbag apparatus according to claim 9, wherein the communication portion is located at a rear end of the partition portion.

11. The side airbag apparatus according to claim 1, wherein an entirety of the partition portion that separates the shoulder protecting portion and the lower region protecting portion is located entirely below a topmost portion of the door trim of the side door.

* * * * *